United States Patent
Fujitani et al.

[11] Patent Number: 6,122,234
[45] Date of Patent: *Sep. 19, 2000

[54] RECORDING DISK DRIVE USING A SYNCHRONOUS DRIVING MOTOR

[75] Inventors: Sakae Fujitani, Hamakita; Yuzuru Suzuki, Shizuoka, both of Japan

[73] Assignee: Minebea Co., Ltd., Nagano

[*] Notice: This patent issued on a continued prosecution application filed under 37 CFR 1.53(d), and is subject to the twenty year patent term provisions of 35 U.S.C. 154(a)(2).

[21] Appl. No.: 08/752,653

[22] Filed: Nov. 19, 1996

[30] Foreign Application Priority Data

Nov. 24, 1995 [JP] Japan .................. 7-306154

[51] Int. Cl.[7] .................. G11B 7/00
[52] U.S. Cl. .................. 369/50; 369/32
[58] Field of Search .................. 369/50, 124, 32, 369/44.28, 48, 47

[56] References Cited

U.S. PATENT DOCUMENTS

| | | |
|---|---|---|
| 3,609,721 | 9/1971 | Mensley . |
| 3,662,350 | 5/1972 | Chertok . |
| 3,876,840 | 4/1975 | Bryant, Jr. . |
| 3,922,530 | 11/1975 | Zupanic .................. 369/2 |
| 3,940,556 | 2/1976 | Boltz, Jr. .................. 369/50 |
| 3,973,080 | 8/1976 | Dickopp et al. . |
| 3,983,316 | 9/1976 | Schopp .................. 369/50 |
| 3,983,318 | 9/1976 | Miller et al. .................. 369/50 |
| 4,025,958 | 5/1977 | Orima et al. .................. 369/75 |
| 4,028,732 | 6/1977 | Salter et al. . |
| 4,390,912 | 6/1983 | Hertrich et al. .................. 360/78.12 |
| 4,800,548 | 1/1989 | Koishi et al. . |
| 4,841,504 | 6/1989 | Yamaguchi et al. . |
| 4,847,708 | 7/1989 | Furuyama . |
| 5,111,345 | 5/1992 | Muller .................. 369/32 |
| 5,412,629 | 5/1995 | Shirane .................. 369/50 |
| 5,553,041 | 9/1996 | Inagawa et al. .................. 369/50 |
| 5,590,105 | 12/1996 | Enami et al. .................. 369/50 |
| 5,592,446 | 1/1997 | Saitoh et al. .................. 369/50 |
| 5,602,812 | 2/1997 | Miura et al. .................. 369/60 |
| 5,627,811 | 5/1997 | Morita et al. .................. 369/50 |
| 5,640,377 | 6/1997 | Watanabe et al. .................. 369/50 |

OTHER PUBLICATIONS

"McGraw–Hill Concise Encyclopedia of Science & Technology", Third Edition, McGraw–Hill, Inc., 1992.

*Primary Examiner*—Nabil Hindi
*Attorney, Agent, or Firm*—Fay, Sharpe, Fagan, Minnich & McKee, LLP

[57] ABSTRACT

The information storing apparatus uses an inexpensive synchronous motor as a spindle motor and can execute speed control quickly and accurately. To achieve this, whether the information storing apparatus is in the ordinary read mode or the seek mode is determined from position information of a pickup. In the read mode, the amount of power supplied to the spindle motor is set at the necessary minimum value. In the seek mode, the rotation speed of the spindle motor is changed to match the pickup speed, and the power to be supplied to the spindle motor is increased. As a result, power consumption in the ordinary state can be minimized, and power savings, low noise, low vibrations, and low heat generation can be realized. In addition, in the seek mode, the power required for changing the rotation speed of the recording disk is increased, so that the torque is increased, thereby performing a quick speed change.

14 Claims, 4 Drawing Sheets

| MOVING SPEED OF PICKUP | MODE | TORQUE COMMAND |
|---|---|---|
| SMALL | READ MODE | A |
| MEDIUM | SEEK MODE WITH SMALL TORQUE | B |
| LARGE | SEEK MODE WITH LARGE TORQUE | C |

RECORDING DISK DRIVE USING A SYNCHRONOUS DRIVING MOTOR

BACKGROUND OF THE INVENTION

1. Field of the Invention

The present invention relates to an information storing apparatus for inputs/outputs information by rotating a disk-like recording medium, e.g., a CD-ROM, at a constant linear speed and, more particularly, to an information storing apparatus in which the driving system for the recording disk is improved to achieve cost reduction, power savings, low noise, and the like.

2. Description of the Prior Art

In an information storing apparatus which inputs/outputs information by rotating a recording disk, e.g., a CD-ROM, at a constant linear speed with respect to a pickup, the recording disk is driven at different rotation speeds in accordance with the positions of the pickup. Accordingly, in such an information storing apparatus, in the ordinary read mode, the rotation speed of the recording disk must be gradually and accurately changed, while in the seek operation, the speed must be changed quickly in order to shorten a seek time, requiring a very large accelerating/decelerating torque when compared to the torque required in the read mode. For this reason, in general, a highly controllable and highly reliable DC brushless motor is used as a driving motor for driving the recording disk.

However, the DC brushless motor is expensive as it needs position detectors, e.g., Hall elements, and is controlled mainly by analog control as it requires speed feedback control, leading to a large circuit configuration. For these reasons, the resultant system cannot sufficiently meet the recent demand for cost reduction.

With recent advances in the digital electronics technology, a technique has been established that can freely control the rotation speed of a two-phase claw-pole stepping motor as a synchronous motor in accordance with the microstep driving scheme. According to this method, a digital control circuit can be constituted without adding any position detector or a speed detector in the motor. As a result, the motor can be rotated at high rotary precision, and the cost of the entire system can be reduced.

When, however, a stepping motor is used as a synchronous motor, unlike in a DC motor, the motor current does not increase or decrease in proportion to the increase or decrease of the load. Therefore, this motor cannot cope with a wide range of torque fluctuations of the load, causing an out-of-step phenomenon in the worst case. As a countermeasure against this problem, a current corresponding to the maximum load is constantly supplied. In this case, however, a large current flows even under a light load in, e.g., the ordinary read mode, which is uneconomical. In addition, since a large current flows, the vibrations, noise, heat, and the like of the motor are large.

SUMMARY OF THE INVENTION

It is an object of the present invention to provide an information storing apparatus in which the electrical input to the motor that drives a recording disk for inputs/outputs information is changed between the information read mode and the seek mode to achieve power savings, low noise, and low vibrations.

According to the present invention, there is provided an information recording apparatus having a recording disk, e.g., a CD-ROM driven at a constant linear speed, wherein a driving motor (spindle motor) for driving the recording disk uses a synchronous motor, the position and moving speed of a pickup that inputs/outputs information to/from the recording disk are detected to determine whether the current mode is the ordinary read mode or the seek mode for moving the pickup to an arbitrary position, and in the seek mode, the rotation speed of the recording disk is changed in accordance with the moving position of the pickup and simultaneously an electrical input value to the spindle motor is increased.

More specifically, in the read mode, the linear speed of the recording disk is constant. Although the rotation speed changes in accordance with the movement of the pickup, changes in speed are small, so that the electrical input value to the spindle motor can be a substantially constant, small value. In the seek mode, as the pickup moves at a high speed, changes in rotation speed are also large. Since the seek operation must be performed within a predetermined period of time, a large accelerating or decelerating torque is required, and the mechanical output of the spindle motor must be increased. The mechanical output value required for the spindle motor is a value that can be uniquely estimated from the moment of inertia of the rotating mechanism, the time until the end of the seek operation, and the like. Hence, a necessary electrical input value is obtained by detecting the moving amount and moving speed of the pickup. The obtained electrical input value is supplied to the spindle motor together with a rotation speed in such a manner that the minimum electrical power is ordinarily fed and is increased by a necessary amount when it must be changed.

DETAILED DESCRIPTION OF PREFERRED EMBODIMENTS

A preferred embodiment of the present invention will be described with reference to the accompanying drawings.

Figure 1:
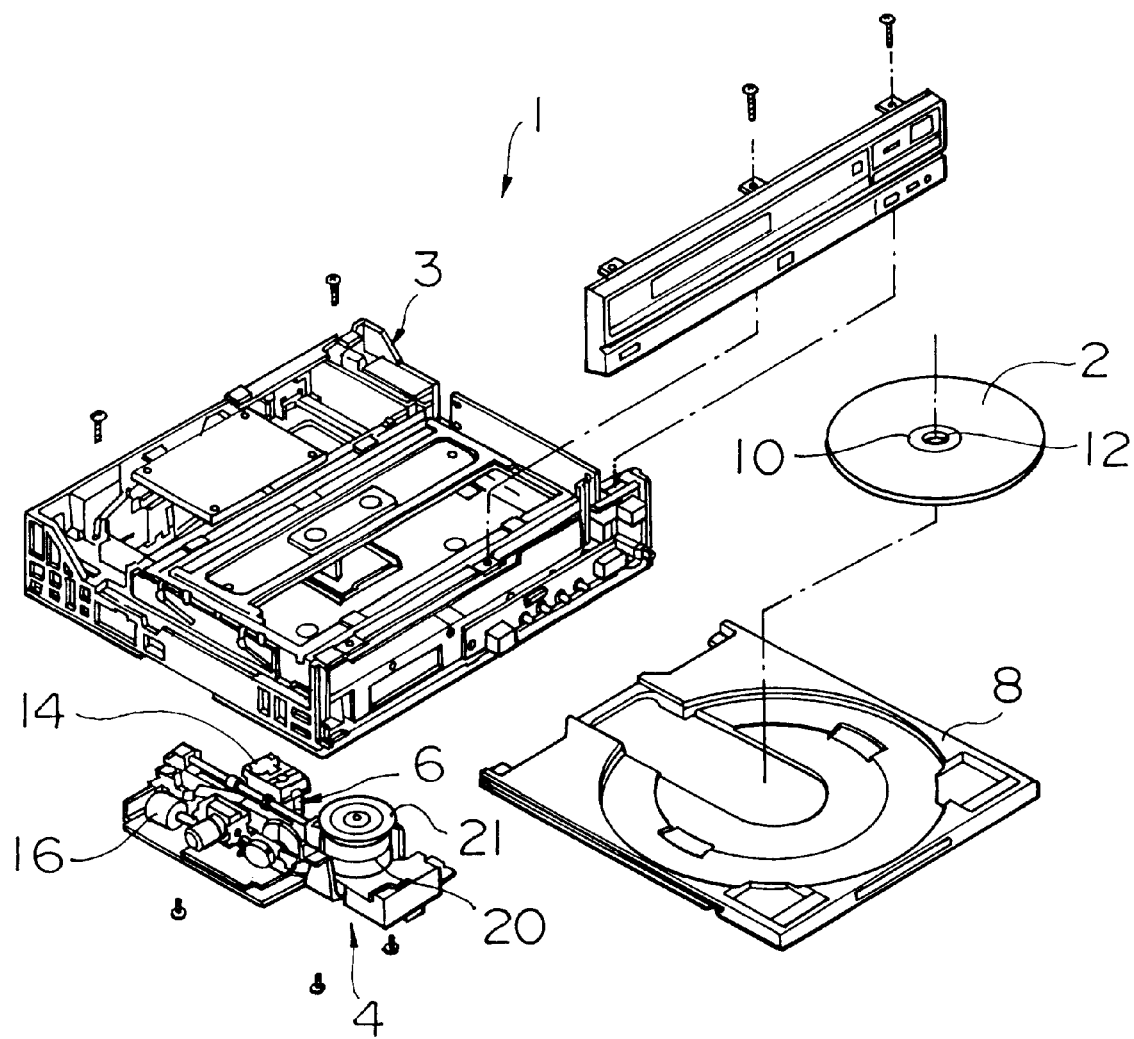
FIG. 1 is an exploded perspective view showing the main part of a CD-ROM drive as an information storing apparatus according to an embodiment of the present invention.

FIG. 1 schematically shows the arrangement of an information storing apparatus 1. The information storing apparatus 1 is a read-only apparatus called a CD-ROM drive and is constituted by a recording disk 2 on which information is recorded and a main body 3.

Small projections called pits are spirally formed on the surface of the recording disk 2, and a disk-shaped hub 10 having a hole 12 at its center is mounted on the recording disk 2.

The main body 3 is constituted by a rotational drive mechanism 4 for rotating the recording disk 2, a read mechanism 6 for reading information from the recording disk 2, a loading mechanism 8 for loading/unloading the recording disk 2 in/from the main body 3.

The rotational drive mechanism 4 is constituted by a spindle motor 20, a chuck portion 21 for fixing the recording disk 2, a controller 22 (not shown in FIG. 1) for controlling the spindle motor 20. The rotational drive mechanism 4 attracts the hub 10 of the recording disk 2 loaded by the loading mechanism 8 by a magnetic force and rotates the recording disk 2 at a predetermined rotation speed. The spindle motor 20 is a two-phase stepping motor. As information is recorded on the recording disk 2 at a constant linear speed, the rotation speed of the spindle motor 20 is changed by the controller 22 as required in accordance with the position of a pickup 14 (to be described later).

The read mechanism 6 is constituted by the pickup 14 and a moving mechanism 16 which moves the pickup 14 in the radial direction of the recording disk 2. The pickup 14 has a light-emitting portion for radiating laser light to the recording surface of the recording disk 2 and a light-receiving portion for sensing the reflected laser light. The pickup 14 is moved by the moving mechanism 16 in the radial direction of the recording disk 2 to follow the pits of the recording disk 2 rotated by the rotational drive mechanism 4, thereby reading the information recorded on the recording disk 2. When a seek command is input, the moving mechanism 16 moves the pickup 14 to an arbitrary position (in the radial direction) of the recording disk 2.

Figure 2:
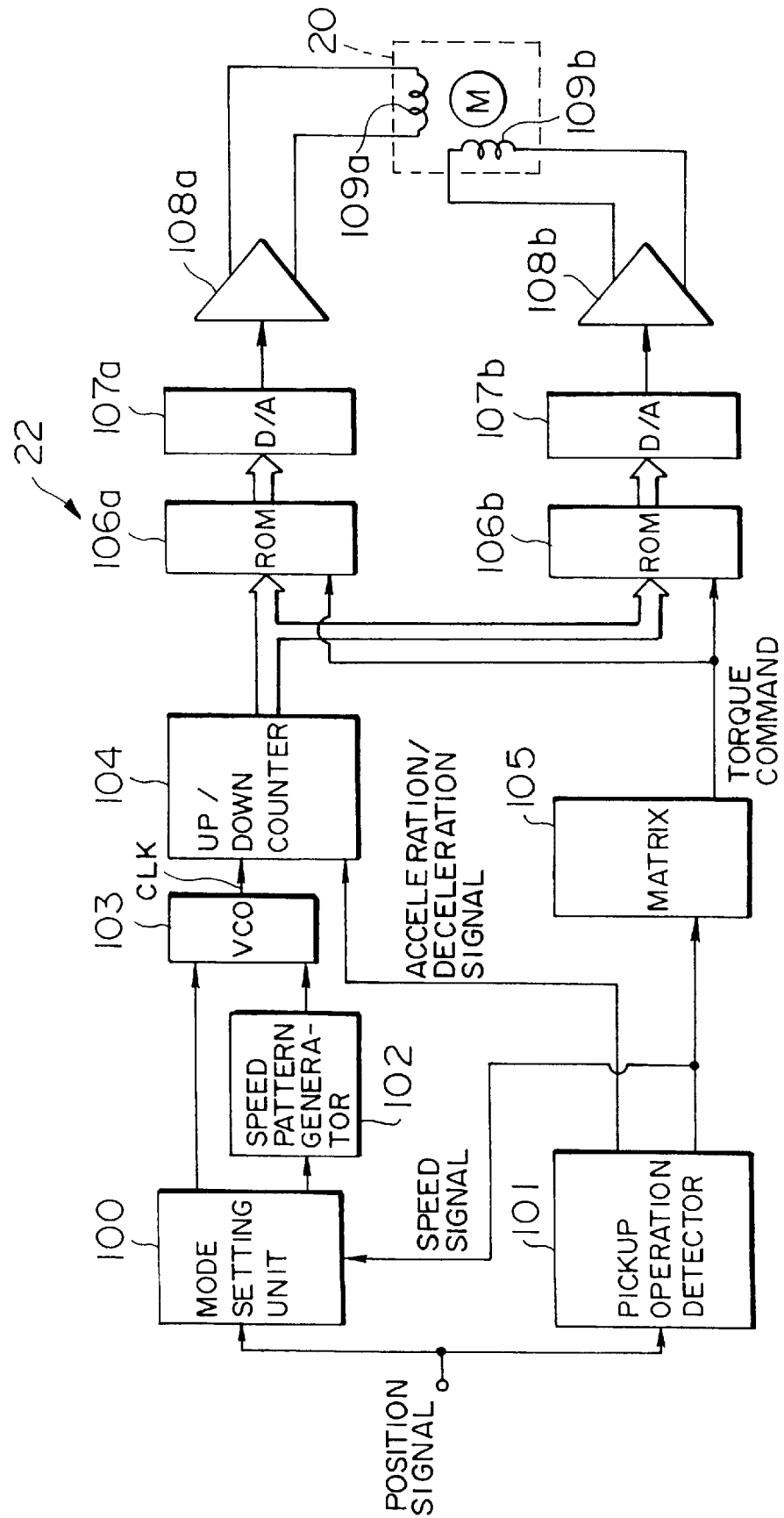
FIG. 2 is a block diagram of the motor control circuit of the information storing apparatus according to the present invention.

The circuit of the controller 22 for controlling the spindle motor 20 will be described with reference to FIG. 2.

The controller 22 is connected to the moving mechanism 16 to receive a position signal indicating the current position of the pickup 14 from the moving mechanism 16. First, the position signal of the pickup 14 is input to a mode setting unit 100 and a pickup operation detector 101. The mode setting unit 100 determines whether the pickup 14 is performing an ordinary read operation or a seek operation from a speed signal sent from the pickup operation detector 101. When the pickup 14 performs a read operation, the mode setting unit 100 sends a read mode pattern signal matching the position of the pickup 14 to a VCO 103. When the pickup 14 is performing a seek operation, the mode setting unit 100 sends a seek mode signal to a speed pattern generator 102.

The pickup operation detector 101 has a clock circuit, detects the moving speed and moving direction of the pickup 14, i.e., whether the pickup 14 is moving to the outer or inner periphery of the recording disk 2, from the position signal of the pickup 14, and sends a speed signal to the mode setting unit 100 and a matrix 105 and the moving direction to an UP/DOWN counter 104 in the form of an acceleration/deceleration signal.

Upon reception of the seek mode signal from the mode setting unit 100, the speed pattern generator 102 sends a seek pattern signal corresponding to the rotation speed pattern to the VCO 103.

Upon reception of the read mode pattern signal or seek pattern signal in the form of an analog voltage signal from the mode setting unit 100 or speed pattern generator 102, the VCO 103 sends a chain of pulse signal (CLK) proportional to this signal to the UP/DOWN counter 104. The signal CLK substantially represents the rotation speed of the spindle motor 20.

Upon reception of the signal CLK from the VCO 103, the UP/DOWN counter 104 counts the pulses, generates an address signal corresponding to the speed, and sends the generated address signal to ROMs 106a and 106b. Furthermore, upon reception of the deceleration signal from the pickup operation detector 101, the UP/DOWN counter 104 supplies an address signal for reversing the rotating direction of the spindle motor 20 to the ROMs 106a and 106b.

Figures 3, 4:
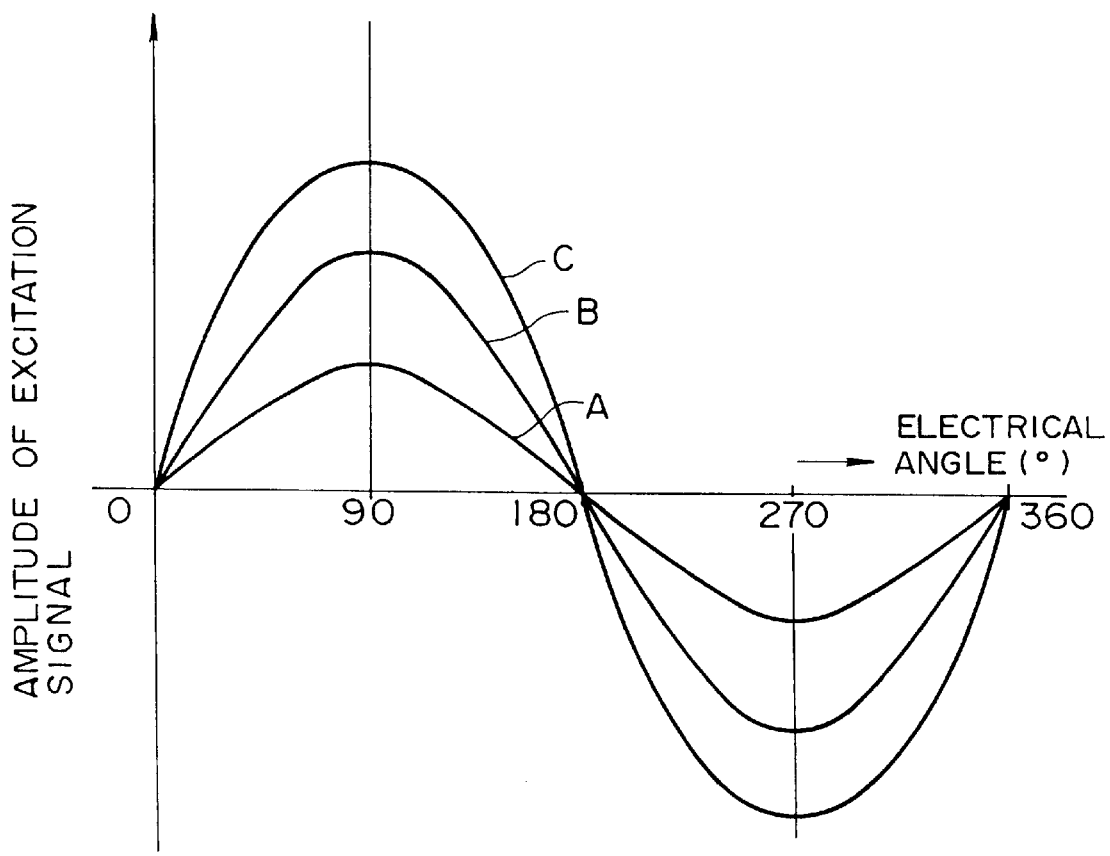
FIG. 3 is a table indicating the relationship between changes in speed of the pickup and torque commands.
FIG. 4 is a graph showing different torque commands for a spindle motor.

Upon reception of the speed signal of the pickup 14 from the pickup operation detector 101, the matrix 105 sends a torque command corresponding to the speed to the ROMs 106a and 106b. As shown in FIG. 3, torque commands are classified into the read mode and the seek mode, and the seek mode is further divided into two categories in accordance with the pickup speed. Thus, the torque commands are classified into three commands A, B and C. More specifically, the torque command A of the read mode has the minimum torque as it changes the rotation speed of the recording disk 2 only little by little. The torque command B has a larger torque than that of the torque command A. The torque command C has the maximum torque as it changes the rotation speed most largely. It suffices if the torque is given such that the rotation speed changes quickly in accordance with the moving speed of the pickup 14, and the number of torque command classifications is not limited to three.

Upon reception of the address signal from the UP/DOWN counter 104 and the torque command (A, B or C) from the matrix 105, the ROMs 106a and 106b output predetermined excitation patterns corresponding to the torque command to D/A converters 107a and 107b.

The excitation pattern output from the ROM 106a will be described.

The ROM 106a stores three types of excitation patterns having the same period, the same form factor, and different amplitudes, as shown in FIG. 4. More specifically, when any one of the torque commands A, B and C is input to the ROM 106a from the matrix 105, an excitation pattern having an amplitude, i.e., a voltage, corresponding to the input torque command is selected, and the selected excitation pattern is output from the ROM 106a at a predetermined frequency in response to the address signal supplied from the UP/DOWN counter 104. During deceleration, the counting direction of the UP/DOWN counter 104 is changed, so that excitation of the spindle motor 20 is set in the reverse mode (alternatively, the ROM 106a may store an excitation pattern for reverse rotation and may output a waveform that reversely drives the spindle motor 20 upon reception of a reverse-drive command). The recording content of the ROM 106b is 90° out of phase from that of the ROM 106a. For example, the ROM 106a stores a sine wave and the ROM 106b stores a cosine wave, so that the ROMs 106a and 106b together generate a two-phase signal.

When a compensation component for the detent torque inherent to the motor is superposed on the sine wave and cosine wave in the ROMs 106a and 106b, the rotating precision can be improved. Furthermore, since the iron loss in the spindle motor 20 differs depending on the amplitudes of the coil excitation waveform, the sine wave and the cosine wave may be distorted to compensate for the iron loss corresponding to the amplitudes stored in the ROMs 106a and 106b.

The D/A converters 107a and 107b convert the contents supplied from the ROMs 106a and 106b into analog signals and output the analog signals to power amplifiers 108a and 108b. The power amplifiers 108a and 108b. amplify the powers and output powers that are 90° out of phase from each other to coils 109a and 109b of the spindle motor 20.

The operation of the information storing apparatus 1 will be described by reference to FIGS. 1 and 2.

When the recording disk 2 is loaded and information reading is started, the mode setting unit 100 sends a read mode pattern based on the position signal to the VCO 103 to send a signal CLK which fluctuates sequentially in accordance with the movement of the pickup 14 to the UP/DOWN counter 104. In this case, an acceleration/deceleration signal is not sent to the UP/DOWN counter 104, and the torque command A is sent from the matrix 105 to the ROMs 106*a* and 106*b* The spindle motor 20 is rotated at a read speed with the minimum rotating torque, thereby rotating the recording disk 2 in a power-saving state requiring a small power consumption.

When a seek command is input, the moving speed of the pickup 14 increases. When the moving speed of the pickup 14 exceeds a predetermined value, it is determined that the current mode is the seek mode. The speed pattern generator 102 sends a rotation speed command to the VCO 103, and the pickup operation detector 101 sends an acceleration/deceleration signal to the UP/DOWN counter 104. The matrix 105 sends the torque command B or C corresponding to the moving speed of the pickup 14 to the ROMs 106*a* and 106*b*. Based on the torque command B or C, the ROMs 106*a* and 106*b* send predetermined amplitude and frequency commands to the D/A converters 107*a* and 107*b*, and the power amplifiers 108*a* and 108*b*. send powers corresponding to these commands to the coils 109*a* and 109*b*, thereby changing the rotation speed of the spindle motor 20 and increasing the power to be supplied to the spindle motor 20. In this way, a torque required for changing the speed is generated in the spindle motor 20, and the rotation speed is changed immediately.

In the above description, in order to adjust power supplied to the spindle motor 20, the amplitude of the supply voltage is changed. However, the present invention is not limited to this method, and the PWM scheme that changes the duty ratio of the supply voltage may be employed instead.

Figure 5:
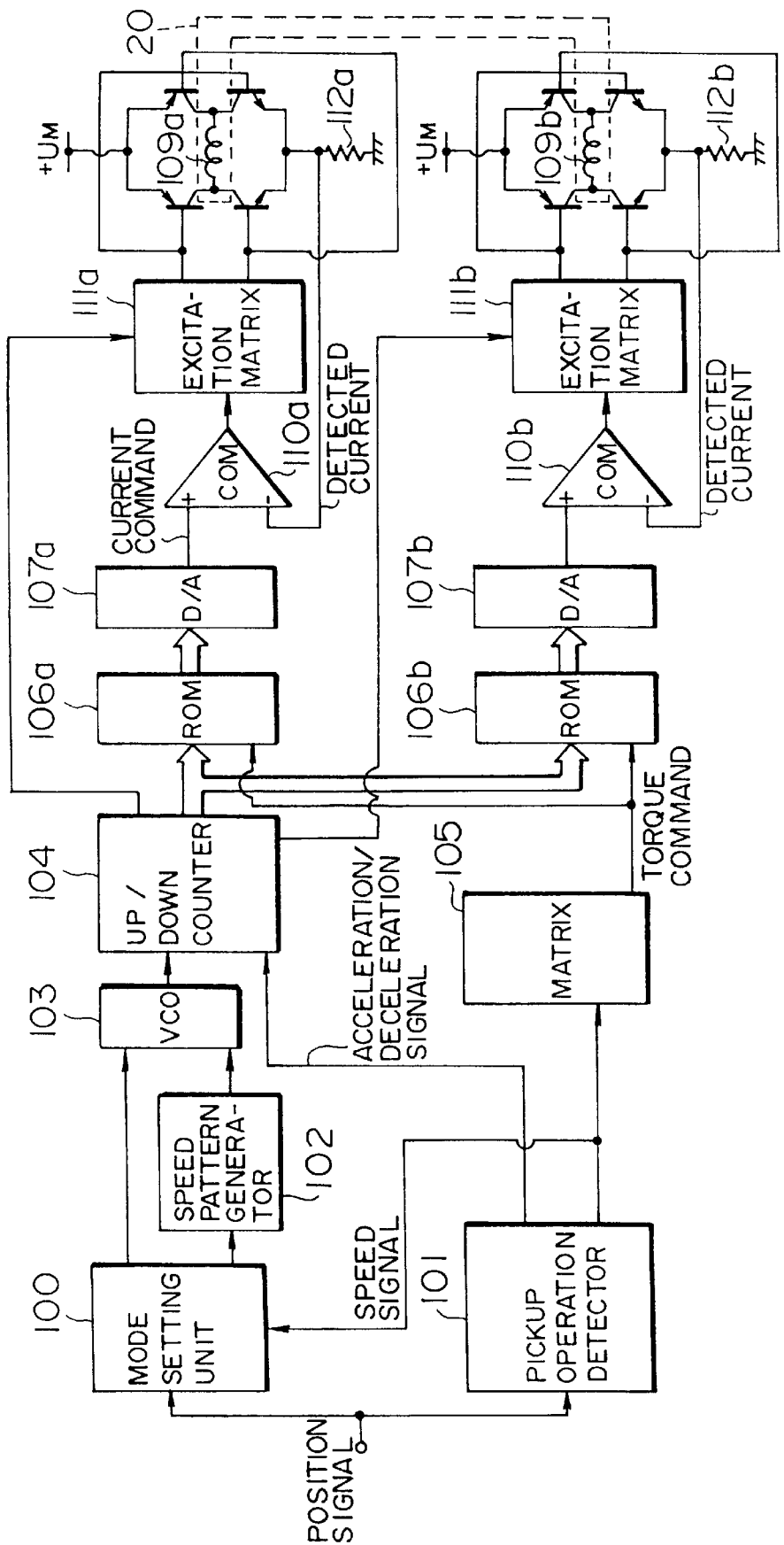
FIG. 5 is a block diagram of the motor control circuit of an information storing apparatus according to another embodiment of the present invention.

Another embodiment of the present invention will be described by reference to FIG. 5.

In this embodiment, rotation control of a spindle motor 20 is performed by current control. FIG. 5 shows the circuit configuration of this embodiment. In FIG. 5, the same reference numerals as in FIG. 2 denote the same components as in FIG. 2. The scheme of this embodiment is different from the above voltage adjusting scheme in that the motor current of the spindle motor 20 is detected by current detectors 112*a* and 112*b*, the detected motor currents are compared with current command values output from D/A converters 107*a* and 107*b* by comparators 110*a* and 110*b*, and the motor current is adjusted such that the detected current value is always equal to the current command values.

Excitation matrices 111*a* and 111*b* are logic matrices for applying appropriate excitation timings and excitation current values to coils 109*a* and 109*b* of the spindle motor 20 in response to the outputs from the comparators 110*a* and 110*b* and a signal from an UP/DOWN counter 104. As a result, a motor current equal to the current command values of the D/A converters 107*a* and 107*b* can be supplied to the coils 109*a* and 109*b* of the spindle motor 20. In the same manner as in the embodiment of FIG. 2, if a plurality of types of excitation patterns having different current amplitudes are stored in ROMs 106*a* and 106*b*, and a torque command to be supplied to the spindle motor 20 and corresponding to the position of a pickup 14 is selected so that appropriate amplitudes of the current command values are selected from the ROMs 106*a* and 106*b*, the input power can be adjusted by the input current to the spindle motor 20.

When decelerating the spindle motor 20, the rotating field may be reversed and the electrical input may be increased. However, DC excitation in which a DC current of a constant direction is supplied to the coils 109*a* and 109*b* may be performed instead. When the spindle motor 20 is decelerated in this manner, the spindle motor 20 is set in the out-of-step state. In this case, when the rotation speed of the recording disk 2 reaches a value approximate to a desired rotation speed, excitation is switched to a rotating field with which a predetermined rotation speed can be obtained, thereby obtaining the predetermined rotation speed.

More specifically, upon reception of a position signal from the pickup, the rotation speed of the recording disk at this position is calculated, and the spindle motor of the recording disk is rotated at a predetermined rotation speed and with the minimum electricity. The moving speed and moving direction of the pickup are obtained from a change over time of the position of the pickup. When the moving speed exceeds a predetermined value, it is determined that the pickup is performing a seek operation, and the spindle motor is controlled in the following manner.

The rotation speed of the recording disk is calculated in accordance with the position of the pickup which is in motion, and an instruction is output to the driving mechanism of the spindle motor such that the recording disk rotates at a rotation speed exceeding the obtained rotation speed. More specifically, when accelerating the spindle motor, its rotation speed is temporarily set at a higher value; when decelerating the same, an instruction for a lower rotation speed is output, and the electrical input to the spindle motor, e.g., the voltage, is increased. After the rotation speed is changed, it is restored to a value corresponding to the position of the pickup.

Therefore, an instruction for changing the rotation speed is supplied to the spindle motor. When this instruction is to change the speed quickly, the rotating torque is increased. Even if the moment of inertia of the recording disk and the entire rotating mechanism that rotates the recording disk is large, the speed can be changed quickly. In addition, since the electrical input is set low in ordinary reading, the power consumption can be decreased and noise and vibrations can be suppressed.

The information storing apparatus can be an apparatus that exclusively reads information from the recording disk or an apparatus that reads and writes information from and on the recording disk. The storing method can be a magnetic or optical method, and can be done with or without in contact with the recording disk. To sense the operation of the pickup, the position information of the pickup may be used. If the moving destination of the pickup can be determined, the information on the destination may be used.

To change the electrical input, the voltage or current may be changed. In case of change in voltage, the amplitude of the supply voltage may be changed, or the duty ratio may be changed. Furthermore, the electrical input may be changed in accordance with the moving amount of the pickup. In this case, the moving amount of the pickup may be classified into desired number.

When decelerating the rotation of the recording disk, the direction of the rotating field may be reversed and a decelerating torque may be applied to the spindle motor. In addition, DC excitation or the like may be performed to apply a decelerating torque. Although this sets the spindle motor in the out-of-step state, if an adequate adjustment is performed, the spindle motor can be rotated accurately.

In this manner, in the information storing apparatus of the present invention, the electrical input to the spindle motor is changed as required by using information (information on the position of the pickup or the like) held by the main body of the storing apparatus. Consequently, the apparatus can perform driving by using an inexpensive synchronous motor (in particular a two-phase claw-pole stepping motor) as the spindle motor in accordance with open loop control employing digital processing without using position detectors or a speed detector. The demerits (the poor motor drive efficiency) of the characteristics of the synchronous motor are removed to improve the driving efficiency, thereby providing an information storing apparatus that achieves power savings and low noise of the entire apparatus.

According to the information storing apparatus of the present invention, the following advantages are expected.

(1) An inexpensive synchronous motor can be used as the spindle motor to greatly decrease the cost.

(2) The input power to the spindle motor is adjusted when changing the rotation speed, and a low input power is ordinarily used. Thus, power savings can be realized.

(3) Since the input power during ordinary reading is low, vibrations and noise of the motor can be greatly decreased.

(4) Since excessive power is not supplied, the amount of heat generated by the motor itself can be decreased.

(5) Non-uniform rotation can be improved.

(6) Since the torque to the motor is increased during seeking, the seek time can be shortened.

What we claim is:

1. An information storage apparatus using a synchronous motor to rotate an information storage disk at a constant linear velocity relative to a pickup head during reading the pickup head moving radially across the storage disk, the apparatus comprising:

a rotatable information storage disk;

a pickup head for reading and seeking information on said disk;

a synchronous motor for rotating said storage disk at a variable rotational speed to achieve a constant linear velocity relative to said pickup head during reading;

a pickup head moving mechanism for moving said pickup head radially between an inner periphery and an outer periphery of said disk, said mechanism moving said pickup head quickly during seeking to minimize a seeking time;

a pickup head operation detector for generating (1) a speed signal when said pickup head moves quickly during seeking, (2) an acceleration direction signal when said pickup head moves from the outer periphery to the inner periphery of said disk during seeking, and (3) a deceleration direction signal when said pickup head moves from the inner periphery to the outer periphery of said disk during seeking; and a motor controlling circuit for applying to said motor a plurality of electrical excitation patterns, said circuit applying (1) a first electrical excitation pattern, which achieves the variable rotational speed and constant linear velocity of said storage disk relative to said pickup head, during reading, (2) a second electrical excitation pattern, which accelerates the variable rotational speed of said disk, upon receiving the speed signal and the acceleration direction signal from said pickup head operation detector and (3) a third electrical excitation, which decelerates the variable rotational speed of said disk, upon receiving the speed signal and the deceleration direction signal from said pickup head operation detector.

2. The apparatus according to claim 1, wherein said pickup head is not in contact with said storage disk, and the motor controlling circuit applies an adjusted electrical excitation pattern to said synchronous motor depending upon a moving speed of said pickup head.

3. The apparatus according to claim 1, wherein one of the second and third electrical excitation patterns is changed stepwise in accordance with the moving speed of said pickup head during seeking.

4. The apparatus according to claim 1, wherein said motor is a stepping motor.

5. The apparatus according to claim 4, wherein said stepping motor is driven under a microstep driving scheme.

6. The apparatus according to claim 1, wherein the electrical excitation patterns are adjusted in terms of adjustment of the voltage.

7. The apparatus according to claim 1, wherein the electrical excitation patterns are adjusted according to an adjusting method wherein an input current to said motor is detected and a detected current value is compared with a reference current value.

8. The apparatus according to claim 1, wherein the third electrical excitation pattern DC-excites said motor.

9. An information storage apparatus using a spindle motor to rotate an information storage disk at a constant linear velocity relative to a pickup head during reading, the pickup head moving radially across the storage disk, the information storage apparatus comprising:

a rotatable information storage disk;

a pickup head for reading information stored on the disk;

a two phase claw pole type stepping motor used as the spindle motor for rotating the storage disk at a variable rotational speed for achieving a constant linear velocity relative to the pickup head while the pickup head is reading information from the disk;

means for determining on the basis of positional information of said pickup head whether said pickup head is in a read operation or in a seek operation; and means for controlling an electric input supplied to said spindle motor under an open loop control so that said electric input will be a minimum as required for said read operation while said electric input will be gradually changed in a predetermined manner for said seek operation, said electric input being an AC input including components indicative of a rotational speed and a torque of the motor, wherein said electric input is supplied to two armature coils of said two phase claw pole type stepping motor at different phase angles.

10. The apparatus according to claim 9, wherein said control means comprises:

means for determining on the basis of a rate of change of said positional information of said pickup head whether said pickup head moves from an outer periphery to an inner periphery of said storage disk or said pickup head moves from the inner periphery to the outer periphery of said storage disk;

means for generating an acceleration signal in said former case and a deceleration signal in said latter case; and means for adjusting said electric input to be supplied to said two phase claw pole type stepping motor so that said electric input has an optimum frequency and level predetermined on the basis of the moving speed of the pickup head and the acceleration or the deceleration signal and whether said pickup head is in the read operation or in the seek operation.

11. The apparatus according to claim 10, wherein said control means comprises:

a memory storing a plurality of electric input pattern information to be supplied to the armature coils of said two phase claw pole type stepping motor; and means for selectively outputting an optimum electric input pattern from said memory on the basis of a moving speed determined by said positional information of said pickup head, and the acceleration or the declaration signal and whether said pickup head is in one of the read operation and the seek operation.

12. The apparatus according to claim 9, wherein said electric input is adjusted in terms of voltage.

13. The apparatus according to claim 9, wherein said electric input is adjusted in terms of current.

14. The apparatus according to claim 9, further comprising:

means for adding DC electric power to said electric input.

* * * * *